May 13, 1969   J. R. FRASSANITO ET AL   3,443,664
MANUALLY OPERATED MOTOR MEANS
Filed May 17, 1967                    Sheet 1 of 2
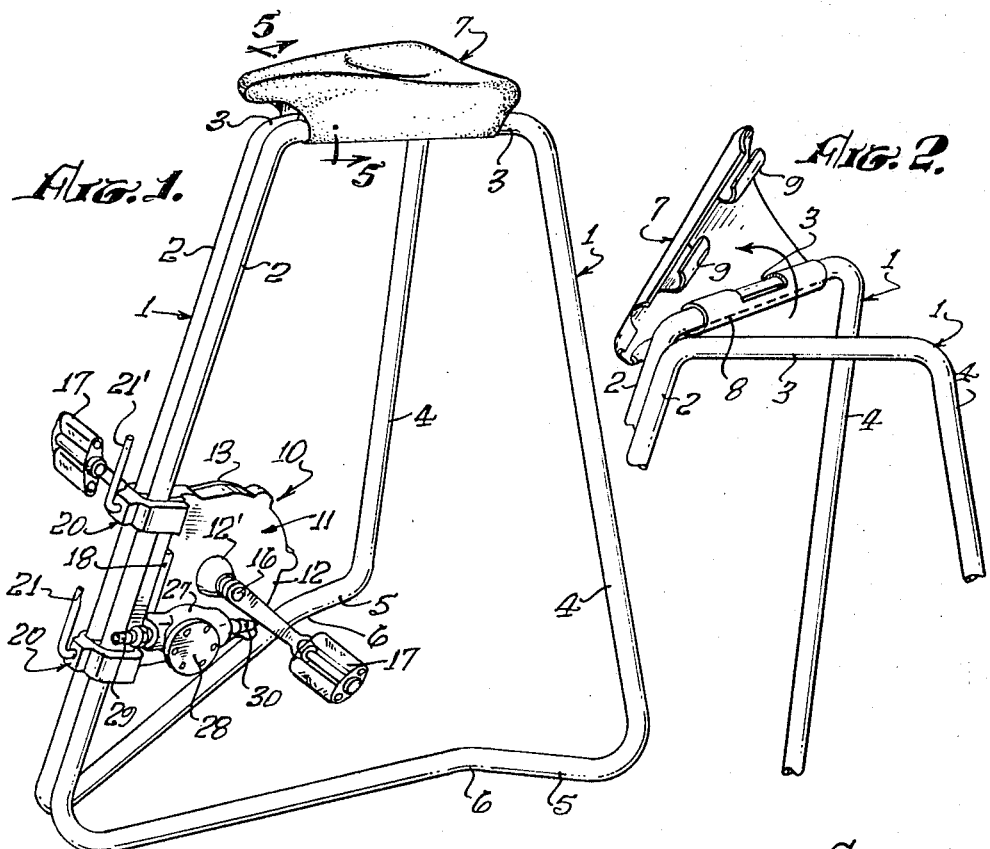
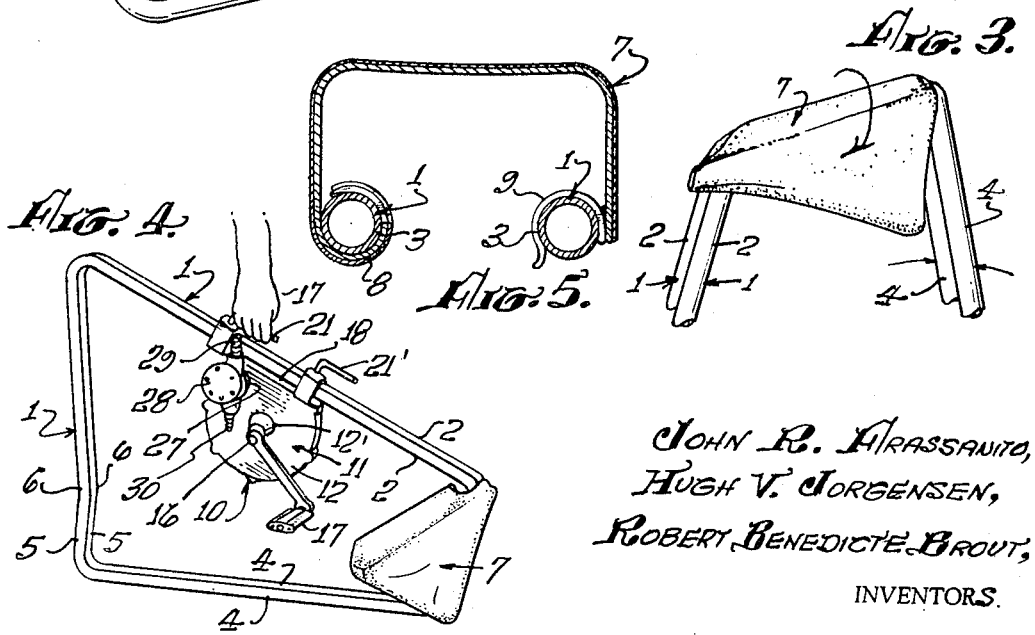
John R. Frassanito,
Hugh V. Jorgensen,
Robert Benedicte Brout,
INVENTORS.

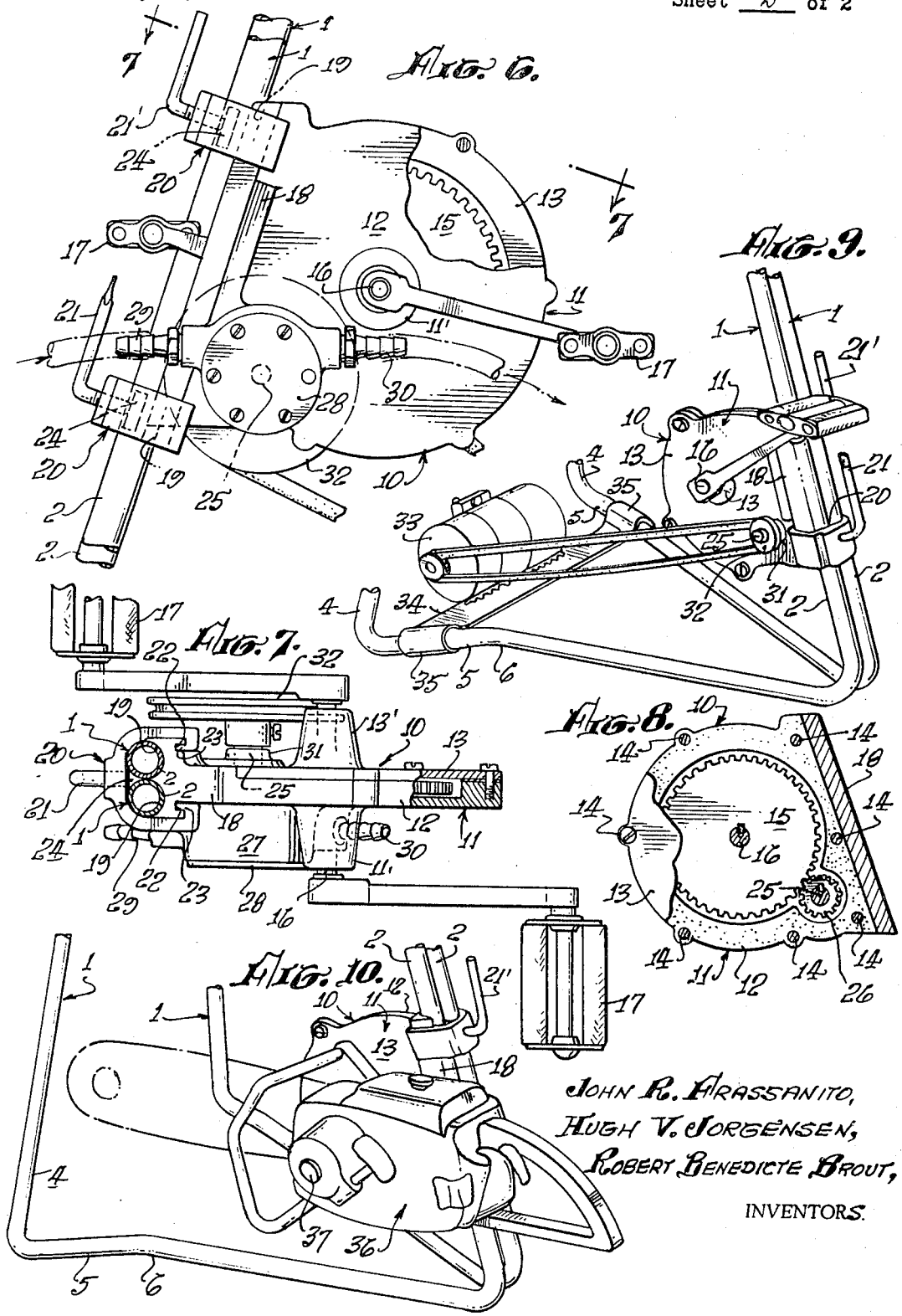

United States Patent Office 3,443,664
Patented May 13, 1969

3,443,664
MANUALLY OPERATED MOTOR MEANS
John R. Frassanito, 8521 Appian Way, Los Angeles, Calif. 90028, Hugh V. Jorgensen, 1921 Beloit Ave., Los Angeles, Calif. 90025, and Robert Benedicte Brout, 4125 Toluca Lake Ave., Burbank, Calif. 91505
Filed May 17, 1967, Ser. No. 639,097
Int. Cl. F03g 5/06; F01k 23/00
U.S. Cl. 185—15               8 Claims

ABSTRACT OF THE DISCLOSURE

A bicycle pedal type of power conversion unit including a seat for the operator and a bicycle pedal type actuated power means effective to convert the manual effort of the operator into a rotating power output. The frame is foldable for transport and storing and the seat forms a portion of the means for securing the frame structure in its folded and unfolded position and the unfolded frame, in turn, affords support for the seat.

BACKGROUND OF THE INVENTION

Field of the invention

The field of the invention is manual powered motors classified in Class 185.

Description of the prior art

Applicants have no knowledge of any comparable prior art devices.

SUMMARY OF THE INVENTION

The objective of the invention is to provide a light weight, easily transported, simple device for converting the manual effort of an operator into usable rotative power. The power conversion means is adjustable on the frame toward and away from the seat of the operator and the seat is a portion of the means which locks the frame in its folded and unfolded position and the open frame, in turn, affords support for the seat. One portion of the means for locking the power conversion means in an adjusted position affords a carrying handle for the folded device and another part of said locking means is alternatively usable as a tool for effecting repair of the device.

Other objects and advantages will be manifest in the details of the description of a presently preferred embodiment illustrated in the accompanying drawings.

BRIEF DESCRIPTION OF THE DRAWINGS

In the drawings:

FIG. 1 is a perspective view of a preferred embodiment of the invention as erected or unfolded for use, FIG. 2 is a fragmentary perspective view showing the unlocking of the frame by the seat component preparatory to folding the frame for transport, FIG. 3 is a fragmentary view similar to FIG. 2 showing the seat as moved to secure the frame in a folded position, FIG. 4 is a reduced scale view of the device folded for transport and showing particularly the mode by which it is carried, FIG. 5 is an enlarged transverse sectional view taken on the line 5—5 of FIG. 1, FIG. 6 is an enlarged side elevational view of the gear and pedal mechanism with portions broken away to show interior construction, FIG. 7 is a plan section on the line 7—7 of FIG. 6 with parts broken away, FIG. 8 is a reduced scale side elevational view from the side opposite the side shown in FIG. 6 with a portion of the gear case cover broken away, FIG. 9 is a perspective view showing the device arranged to drive an electric generator or the like, and FIG. 10 is a perspective view of the device with the motor of a chainsaw mounted on the shaft normally used as the driven shaft of the device as a substitute for manual or pedal-operated power.

DETAILED DESCRIPTION OF PREFERRED EMBODIMENT

Referring to the drawings, the illustrated embodiment of the invention comprises a frame structure including a pair of identical frame members 1, 1, each formed of tubular metal bent into a trapezoidal configuration including (with reference to the position occupied in use) an upwardly diagonally rearwardly extending front run 2, a horizontal rearwardly extending top run 3, descending, diagonally rearwardly extending rear run 4 and a forwardly extending bottom run 5 having a slight upward and thence downward bend 6 adjacent the rear end thereof for a purpose presently to be described. A seat member 7 formed of sheet metal and somewhat resembling a bicycle seat is pivotally mounted on the top run 3 of one of the frame members by an integral portion 8 of said seat which is bent around the top run and the opposite side of the seat is provided with a pair of spring clips 9, 9 adapted to be resiliently engaged with and disengaged from the top run 3 of the other of said frame members. As best shown in FIG. 2, the seat when engaged with both top runs holds the frames 1, 1 in rearwardly diverging relation to one another as viewed in plan with the front runs 2, 2 thereof in side-by-side relation. The bends 6, 6 in the bottom runs cause the corners joining the runs 4 and 5 of the frame to combine with the adjacent corners of the runs 2 and 5 to form a three-point support for the opened or unfolded frame.

The power means 10 comprises a gear case 11 including a body 12, a cover 13 secured thereto by screws 14 housing a large gear 15 carried by a shaft 16 extending through the gear case and journalled in bearing bosses 12' and 13' terminating in radially oppositely disposed pedals 17, 17 on the ends thereof. The power means is mounted on the inner or rear faces of the front runs 2, 2 by means affording capacity for infinite adjustment of said power means longitudinally of said runs. The mounting means for said power means comprises a forwardly projecting boss 18 having parallel grooves 19, 19 on the forward face thereof in which the rear sides of the runs 2, 2 are received and clamp members 20, 20 associated with said bosses carrying manually operated screws 21 and 21' serve to clamp the power unit 10 in a desired distance from the seat to comfortably accommodate the pedals to an operator occupying the seat. Specifically, the upper and lower ends of the boss 18 are each provided with a pair of rearwardly facing grooves 22, 22 disposed at opposite sides of the grooves 19, 19 and extending parallel thereto and the clamp members (see FIG. 7) are provided with forwardly extending complementary tongues 23, 23 engaging said grooves. The clamp screws 21 and 21' engage an elongated triangular member 24 having the apex thereof interposed between the front runs 2, 2 so that tightening the clamp screws secures the power unit in adjusted position along the front runs. These screws must, of course, be loosened incident to folding or unfolding of the frame and then retightened and thus serve to assist the seat to hold the frame members in the folded or unfolded position. Other uses of these screws will be hereinafter referred to.

Journaled in the gear case 11 is a second shaft 25 extending parallel to the shaft 16 and carrying a pinion 26 meshing with the gear 15. Having reference to FIGS. 1, 4, 6 and 9, an embodiment of the invention is shown in which the gear case body 12 carries an integrally formed housing 27 suitably aligned with the axial line of the shaft 25 and closed by a cover plate 28 in which housing any suitable form of rotary pump impeller means may be mounted on the shaft 25, said pump housing being provided with inlet and outlet ports served by nipples 29 and 30. The opposite end of the shaft 25 extends through a bearing boss 31 formed in the cover 13 and affords mounting means for a belt pulley 32 which may be of any desired size permitted by the overhanging bearing boss 13' and such pulley may be employed to transmit power to other mechanisms as, for example, an electric generator 33 mounted on a supporting plate 34 having suitably inturned ends 35, 35 engaging the bottom runs 5, 5 of the frame members rearwardly of the bends 6, 6 therein.

The shaft 25 also permits, where desired, the application of a prime mover to the power unit. As shown, by way of example, in FIG. 10, the engine component 36 of a chainsaw is shown thus mounted with the drive shaft 37 thereof coupled by means (not shown) to the shaft 25.

Referring finally to FIG. 4, the mode of carrying the device is illustrated. In this figure, the device is folded and the power unit is shifted along the runs 2, 2 of the frame members to a point at which the handle portion of the screw 21 is disposed approximately in vertical alignment with the center of gravity of the device when suspended or held by the handle. The screw is tightened at the point and the screw threads are so oriented circularly of the screw and the associated clamp that when the screw is tightened, the handle portion will be at least substantially aligned with the runs 2, 2 and will be pointing in the direction of the seat. When the device is unfolded and set up for use, the power unit will, of course, be vertically adjusted to suit the conditions for the intended use, e.g., to accommodate the leg length of an operator or to tighten the driving belt, etc. The end of the handle portion of the screw 21 is formed as a screwdriver bit to provide the only tool necessary to dismantle and reassemble the power unit for repairs or replacement of parts wherefore, the device includes its own repair tool means.

Thus there has been provided a most sufficient power converting unit for use in those areas in which prime movers cannot be afforded and which makes more efficient use of manpower than the treadmill type of water wheels used for irrigation purposes in such areas and moreover, the device is capable of still other uses as a power source, some of which have been described.

While in the foregoing specification, a presently preferred embodiment of the invention has been disclosed, such disclosure has been by way of example and it is not to be inferred therefrom that the invention is limited to the precise details of construction so disclosed. Accordingly, it will be understood that the invention includes as well, all such changes and modifications in the parts and in the construction, combination and arrangement of parts as shall come within the purview of the appended claims.

We claim:

1. In a manually operated motor means, a frame structure including a supporting seat for an operator, a pedal operated power means for translating effort of the operator on said power means into a rotary power output mounted on said frame structure, means operable to secure said power means on said frame structure at varying distances from said seat to accommodate leg lengths of different operators, said frame structure comprising relatively movable components capable of being moved between folded and an unfolded positions and said seat and said means securing said power means on said frame structure being effective, additionally to secure said frame structure components in the desired ones of said positions.

2. A motor means as claimed in claim 1 in which said frame components each comprise a length of tubing bent into a substantially trapezoidal configuration and in which said seat includes a portion which is pivotally connected to one of said components and includes means having snap-in engagement with the other of said components so disposed relative to said pivoted connection as to position said components in their unfolded position when engaged with said other of said components.

3. A motor means as claimed in claim 1 in which the interengagement between said power means and said frame structure permits limited pivotal movement of said frame structure components incident to movement thereof between said folded and unfolded positions.

4. A motor means as claimed in claim 1 in which said power means includes a pump driven thereby.

5. A power means as claimed in claim 1 in which said power means includes a belt pulley affording connection with a mechanism to be operated by said power means.

6. A motor means as claimed in claim 1 in which said power means includes a gear case enclosing a driving shaft carrying operating pedals and actuating a driving gear within said case, a driven shaft carried by said case and actuated by a pinion meshing with said driving gear and an element of mechanism operated by said driven shaft.

7. A motor means as claimed in claim 1 in which said means for securing said power means on said frame structure includes at least one screw operated clamp and in which the screw component of said clamp serves additionally as a handle for transport of said motor means.

8. A motor means as claimed in claim 1 in which said frame structure components include bends which are positioned adjacent to one another to constitute one supporting foot portion of the unfolded frame structure and other bends which are positioned apart when the frame structure is unfolded and which cooperate with said adjacent bends to give said unfolded frame structure a tripod footing.

No references cited.

EDGAR W. GEOGHEGAN, *Primary Examiner.*

U.S. Cl. X.R.

60—6; 74—512, 525